United States Patent Office 2,773,551
Patented Dec. 11, 1956

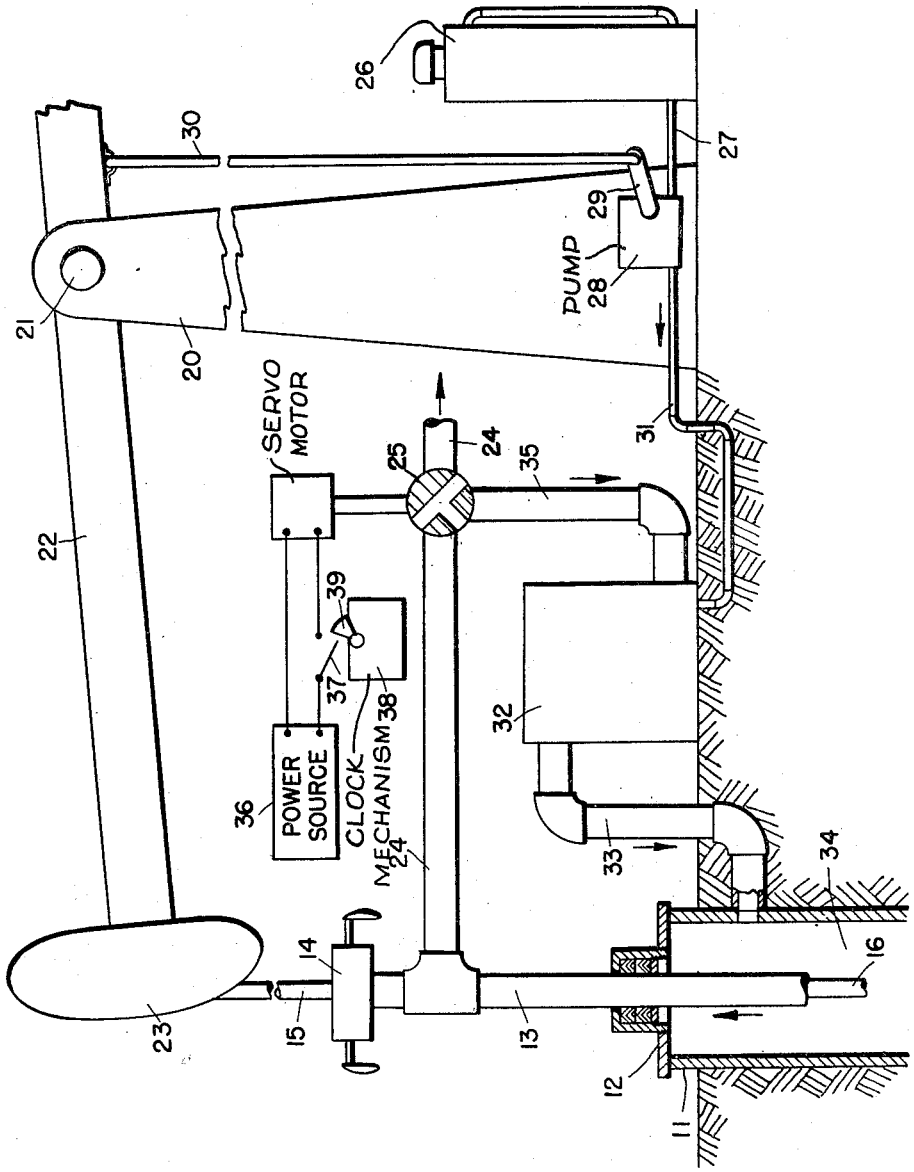

2,773,551

AUTOMATIC INHIBITOR INJECTION SYSTEM FOR PUMPING WELLS

Robert Lankford Warden and Kenneth Wayne Robertson, Odessa, Tex., assignors to Shell Development Company, New York, N. Y., a corporation of Delaware Application August 23, 1954, Serial No. 451,646

4 Claims. (Cl. 166—75)

This invention relates to chemical feeding apparatus and automatic control means therefor, and pertains more particularly to apparatus for pumping measured quantities of liquid having chemically active properties down the casing of an oil or gas well to prevent or mitigate hydrate formation, emulsion formation, or the corrosion of the equipment located in the well.

In many oil fields, the nature of the fluid or fluids in the producing formation is such that it is necessary to add to the fluid some material or chemical substance which beneficially affects the fluid and/or counteracts certain deleterious properties which may be possessed by the fluid. For example, in many oil fields the production fluid is corrosive by nature so that the well casing, production tubing and other production equipment are rapidly corroded, thus necessitating frequent replacement.

In other cases, formation waters in the well may combine with certain hydrocarbons in the production fluid to form hydrates which are undesirable in that they tend to clog or reduce the throughput of the production equipment. In other fields, formation waters often mix with oil within a well to form emulsions which must be broken in order to separate the oil therefrom before piping it to storage tanks.

While emulsified oil and water may be separated by various means and methods at the surface of the well, it is often desirable to break an emulsion, or prevent its formation, within the well substantially adjacent to the producing zone by introducing into the well a suitable demulsifying agent. Likewise, to prevent the formational hydrates within a well, it is desirable to introduce similarly a hydrate inhibitor or a hydrate agent. In a like manner, a corrosion inhibitor may be introduced into a well wherein it becomes mixed with the production fluid and is produced therewith to form a protective layer or film on the production equipment.

In a normal low pressure or pumping well, the corrosion inhibitor, emulsifier or dehydrating agent, either undiluted or dissolved in a suitable solvent or suspended in a suitable fluid, is normally fed down the annulus of a well between the well casing and the production tubing, thus becoming commingled with the fluid in a well and being pumped or flowed from the well therewith. At present, various methods are employed for introducing a chemical reagent into a well where it becomes commingled with the well fluid. Most of the presently known methods possess certain undesirable features in that they are inaccurate in the amount of chemical being injected, time consuming with regard to the time needed for the operating personnel to inject the chemical into the well, inefficient in that the chemical at times is not completely flushed down the well casing, and expensive from the standpoint of the amount of additional equipment which must be employed to inject the chemical into the well.

It is therefore a primary object of the present invention to provide apparatus for automatically injecting a chemical reagent into a pumping well.

A further object of this invention is to provide an automatic chemical injection system for wells which accurately measures out a predetermined amount of chemical, injects it into the well casing of a well, and then flushes it down the well.

Another object of this invention is to provide an automatic chemical injection system for wells being produced by a pump, whereby the amount of the chemical to be injected into the well is first measured out in predetermined increments by each stroke of the pump.

These and other objects of this invention will be understood from the description taken with reference to the attached schematic drawing diagrammatically showing the present system positioned adjacent a well being produced by a pump which is actuated by a walking beam type of prime mover.

Referring to the drawing, a typical well installation is illustrated as comprising a well casing 11 which is cemented in the borehole, the upper end of the casing being closed by a plate 12 or any other suitable closure means. Passing through the casing closure means 12 in a fluid tight manner is a production tubing string 13 which is suspended within the casing 11 in a manner well known to the art. The production tubing string 13 extends downwardly into the casing to a position near the bottom of the well where a pump (not shown) is secured to the lower end of the tubing string 13. The top of the tubing string 13 is closed by a conventional stuffing box 14 which surrounds a polished rod 15 mounted for vertical reciprocation through the stuffing box 14. The polished rod 15 is coupled to a string of sucker rods 16 which are positioned within the tubing string 13 and extend downwardly to the bottom of the well where it actuates the plunger of the pump.

The surface portion of a conventional oil well pump installation is diagrammatically shown in the drawing as comprising a vertical framework or standard 20 which has bearings 21 mounted at its upper end to support a walking beam 22. The walking beam 22 is operated by means of any suitable prime mover means (not shown). The head 23 of the walking beam 22 is secured to the polished rod 15 for reciprocating the polished rod 15 and the sucker rod string 16 within the production tubing 13 to actuate the pump at the bottom of the well which raises well fluid up the production tubing string 13 to discharge it through the flowline 24 connected to the tubing string 13 just below the stuffing box 14.

The three-way valve 25 is positioned in the flowline 24 for controlling the flow of fluid therethrough. Normally, the valve 25 is open so that the fluid stream passes through the flowline 24 to suitable storage tanks (not shown) or to a central pipeline for conveying the oil away from the lease.

The chemical injection system for the present apparatus comprises a chemical storage tank 26 connected by means of a conduit 27 to a chemical metering pump 28. The chemical metering pump is actuated by reciprocating the lever arm 29 in a vertical plane, may be actuated by other means: gas motor, electric motor, spring wound clock, by any suitable prime mover means energized by electrical, pneumatic or mechanical means. For example, the lever member 29 may be reciprocated in timed relation with the action of the sucker rod string 16 within the well by connecting the lever 29 to the reciprocating walking beam 22 by means of a linkage member 30. The discharge conduit 31 from the chemical metering pump 28 communicates with a flushing chamber 32 which acts as an intermediate storage tank in which a predetermined amount of chemical agent may accumulate. The use of this intermediate storage tank or flushing chamber 32 permits the periodic injection of a batch or slug of a chemical agent into the well, rather than a continuous injection of small amounts thereof. The discharge conduit 33 from the flushing chamber 32 is in communication with the annular space 34 between the well casing 11 and the tubing string 13. A second intake conduit 35 is in communication between the flushing tank 32 and the three-way valve 25.

The three-way valve 25 is preferably of the electrically-actuated type, but may be gas or air operated, such as a diaphragm valve where gas pressure is available, and is normally open so that the flow of fluid is through flowline 24 to storage tanks. The control circuit of valve 25 comprises a power source 36 and a control switch 37 which is normally open. The control switch 37 is adapted to be closed by a time-responsive device such as an electric, gas or spring driven clock mechanism 38 of any desired type. For simplicity, this mechanism is shown in the drawing as comprising a rotating segment 39 adapted to close the switch 37 by contact therewith. It may be seen that the time at which the switch 37 is closed and opened can be accurately preset or controlled by suitably adjusting the speed of rotation of the segment 39 and/or the size of the segment.

In operation, oil is produced up the tubing string 13 and out the flowline 24 to storage tanks as long as the walking beam 22 continues to raise and lower the polished rod 15 and sucker rod string 16 to actuate the pump at the bottom of the well. At the same time, the walking beam 22 continuously actuates, through linkage arm 30, the lever arm 29 of the chemical metering pump 28, whereby small increments of a chemical reagent are measured and pumped from the chemical storage tank 26 into the flushing tank 32, where a batch of the chemical reagent accumulates.

At predetermined intervals the rotating segment 39 of switch 38 periodically closes switch 37 to energize the electrically or gas actuated valve 25 so that the normal well production fluid flowing through the line 24 is directed by valve 25 through conduit 35 and into the flushing chamber 32. The well fluid entering the flushing chamber 32 from conduit 35 quickly fills the flushing chamber and washes the batch of chemical reagent therein out the discharge conduit 33 and into the annular space 34 between the well casing 11 and the tubing string 13. The flow of well fluid through the flushing chamber and into the well casing is continued until the entire batch of chemical reagent has been washed to a predetermined level in the well casing. The production fluid forms an inexpensive medium by which the chemical reagent may be washed to the bottom of the well. Thus, it may be seen that the present automatic injection system comprises an inexpensive and efficient apparatus by which large batches of a chemical treating agent may be measured and then forced batchwise down a well casing to combat corrosion, hydrate formation or emulsification within the well.

I claim as my invention:

1. A well system having a well casing, a production flowline, and an apparatus for automatically and periodically injecting relatively large batches of a chemical reagent into the well casing, said apparatus comprising a chemical metering pump, a chemical storage tank connected to the input of said metering pump, a flushing chamber connected to the output of said metering pump, prime mover means for actuating said chemical metering pump, to force increments of a chemical reagent from said storage tank to said flushing chamber, first conduit means in communication between said flushing chamber and said well casing, a power-operated three-way valve in said well flowline, by-pass conduit means in communication between said three-way valve and said flushing chamber, and circuit means for periodically actuating said three-way valve to direct the flow of fluid from said well flowline through said by-pass conduit means and into said flushing chamber to be discharged therefrom into the well casing together with the chemical reagent supplied to the flushing chamber by the metering pump.

2. A well system having a well casing, a pumping installation being actuated by a walking beam, and comprising a production flowline, and an apparatus for automatically and periodically injecting relatively large batches of a chemical reagent into the well casing, said apparatus comprising a chemical metering pump, a chemical storage tank connected to the input of said metering pump, a flushing chamber connected to the output of said metering pump, linkage means interconnecting said chemical metering pump and said walking beam whereby said chemical metering pump is actuated on each stroke of said walking beam to force an increment of a chemical reagent from said storage tank to said flushing chamber, first conduit means in communication between said flushing chamber and said well casing, an electrically operated three-way valve in said well flowline, by-pass conduit means in communication between said three-way valve and said flushing chamber, and circuit means for periodically actuating said three-way valve to direct the flow of fluid from said well flowline through said by-pass conduit means and into said flushing chamber to be discharged therefrom into the well casing together with the chemical reagent supplied to the flushing chamber by the metering pump.

3. A well system having a well casing, a pumping installation being actuated by a walking beam, and comprising a production flowline, and an apparatus for automatically and periodically injecting relatively large batches of a chemical reagent into the well casing, said apparatus comprising a chemical metering pump, a chemical storage tank connected to the input of said metering pump, a flushing chamber connected to the output of said metering pump, linkage means interconnecting said chemical metering pump and said walking beam whereby said chemical metering pump is actuated on each stroke of said walking beam to force an increment of a chemical reagent from said storage tank to said flushing chamber, first conduit means in communication between said flushing chamber and said well casing, an electrically operated three-way valve in said well flowline, by-pass conduit means in communication between said three-way valve and said flushing chamber, an energizing electric circuit for said valve, and a switch in said electrical circuit adapted to be closed periodically for actuating said three-way valve to direct the flow of fluid from said well flowline through said by-pass conduit means and into said flushing chamber to be discharged therefrom into the well casing together with the chemical reagent supplied to the flushing chamber by the metering pump.

4. A well system having a well casing, a pumping installation being actuated by a walking beam, and comprising a production flowline, and an apparatus for automatically and periodically injecting relatively large batches of a chemical reagent into the well casing, said apparatus comprising a chemical metering pump, a chemical storage tank connected to the input of said metering pump, a flushing chamber connected to the output of said metering pump, linkage means interconnecting said chemical metering pump and said walking beam whereby said chemical metering pump is actuated on each stroke of said walking beam to force an increment of a chemical reagent from said storage tank to said flushing chamber, first conduit means in communication between said flushing chamber and said well casing, an electrically operated three-way valve in said well flowline, by-pass conduit means in communication between said three-way valve and said flushing chamber, an energizing electric circuit for said valve, a normally open switch in said electrical circuit adapted to be closed periodically for actuating said three-way valve to direct the flow of fluid from said well flowline through said by-pass conduit means and into said flushing chamber to be discharged therefrom into the well casing together with the chemical reagent supplied to the flushing chamber by the metering pump, and a time-responsive device positioned adjacent said switch for periodically closing said switch to energize said circuit at predetermined intervals.

References Cited in the file of this patent
UNITED STATES PATENTS

| | | |
|---|---|---|
| 2,047,414 | Henry et al. | July 14, 1936 |
| 2,174,123 | Davis | Sept. 26, 1939 |